Patented Oct. 16, 1934

1,976,923

UNITED STATES PATENT OFFICE 1,976,923

AMINO-ALKYL-ESTERS OF THE CARBOXY-ALKOXY-AMINO-DIPHENYLS

Walter G. Christiansen, Glen Ridge, N. J., and Adelbert W. Harvey, Pittsburgh, Pa., assignors to E. R. Squibb & Sons, Brooklyn, N. Y., a corporation of New York No Drawing. Application October 29, 1932, Serial No. 640,332

12 Claims. (Cl. 167—52)

This invention relates to amino-alkyl esters of the carboxy-alkoxy-amino-diphenyls, such as the dialkyl-amino-alkyl esters of 3-carboxy-4-alkoxy-4'-amino-diphenyl and salts thereof, and more particularly the invention relates to 3-beta-diethyl-amino-carbethoxy-4 -ethoxy- 4' - amino-diphenyl and its hydrochloride. It includes both the new compounds and anesthetics comprising these compounds.

The new compounds are advantageously prepared from an hydroxy-carboxy-diphenyl by first etherizing to block the OH group and then nitrating. The nitro derivative is then converted to a desired dialkyl-amino-alkyl ester which is then reduced to an amine. However the invention is not limited to the methods of preparation herein disclosed.

Various steps in the preparation of 3-beta-diethyl -amino-carbethoxy-4 -ethoxy- 4'- amino-diphenyl are represented by the following formulæ to indicate one method of preparing these compounds:

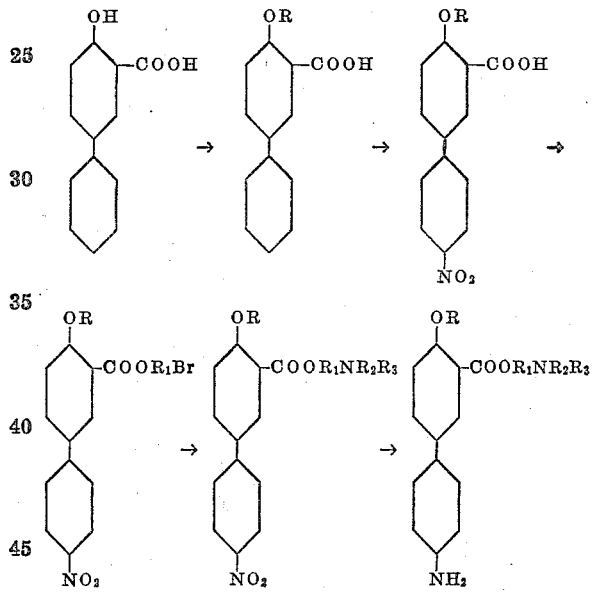

3-carboxy-4-hydroxy-diphenyl may be prepared by the method disclosed in the application of Adelbert W. Harvey, Serial No. 614,473, filed June 4, 1932. 170 grams of 4-hydroxy-diphenyl is converted into the sodium phenolate by heating to boiling with 40 grams of sodium hydroxide in 400–600 cc. of solution. The sodium phenolate may be recovered by direct evaporation over a free flame or by any other suitable method of evaporation. Care should be taken to prevent the solution of the incompletely dried mixture from absorbing carbon dioxide. Final drying of the phenolate is carried out in vacuo, about 10 mm., at 180° C. for some time, usually five hours, after no more water is collected in an ice trap.

The dry pulverized phenolate is treated with carbon dioxide in an autoclave at a pressure of approximately 90 pounds per square inch to form the sodium salt of 3 - carboxy - 4 - hydroxy-diphenyl. The temperature is held at 110–120° C., for one hour, increased to 160–170° C., and held at the latter temperature for 3–4 hours. The reaction product is placed in 3000–4000 cc. of water, heated to boiling, and then, preferably after filtering, treated with carbon dioxide until no more 4-hydroxy-diphenyl is precipitated. The suspension is filtered to remove the unconverted 4-hydroxy-diphenyl and the 3-carboxy-4-hydroxy-diphenyl is precipitated by acidification with mineral acid. The product is then filtered off, washed with water and dried.

214 grams of 3-carboxy-4-hydroxy-diphenyl is converted into the disodium derivative (sodium salt and sodium phenolate) by treatment with 80 grams of sodium hydroxide dissolved in 3000–4000 cc. of water. The mixture is boiled until all of the 3-carboxy-4-hydroxy-diphenyl has been dissolved and is then evaporated to dryness. Final drying is conveniently carried out by placing in an oven at 105–110° C. for several hours. The dry disodium compound is treated with 154 grams of ethyl sulfate, or more conveniently with a considerable excess over this amount, and heated for 3–4 hours at 145° C. During the early stages of heating, at 105–120° C., a small quantity of alcohol and ether is distilled off after which no further distillation takes place. Care must be taken to control the temperature to prevent decomposition of the ethyl sulfate with possible sulfonation of the 3-carboxy-4-hydroxy or the resulting ethylated derivative. Following the reaction period, the greater part of any excess of ethyl sulfate is removed by distillation in vacuo at a pressure of 13 mm. at about 100° C. The residue, which consists largely of sodium sulfate or sodium ethyl sulfate, depending on the excess of ethyl sulfate used, a small amount of ethyl sulfate and the ethyl ester of 3-carboxy-4-ethoxy-diphenyl is conveniently separated by boiling with water and mechanical separation of the hot aqueous solution from the water insoluble ester.

The free acid, 3-carboxy-4-ethoxy-diphenyl, is made from the ethyl ester by saponification with sodium hydroxide and precipitation with a mineral acid, such as hydrochloric acid. This acid is purified by recrystallization from alcohol. 48.4 grams (0.2 mol.) of 3-carboxy-4-ethoxy-diphenyl is dissolved in 175 cc. of glacial acetic acid by warming to a temperature of 70–80° C. The solution is held at 70–75° C. while a slight excess over 0.2 mol. of nitric acid is added very slowly during 1–2 hours. A satisfactory yield was obtained by adding 14.5 cc. of nitric acid (sp. gr. 1.42) diluted with 50 cc. of glacial acetic acid during two hours. The solution is preferably mechanically agitated during the addition of the nitric acid, and heating at 70–75° C. should be continued for 1–2 hours after all the nitric acid has been added. Instead of proceeding as here described, good yields have resulted from nitrating both 3-carboxy-4-ethoxy-diphenyl and 3-carboxy-4-butoxy-diphenyl by adding the nitric acid rather rapidly and increasing the temperature, after the addition of the nitric acid, to from 90 to 100° C.

On cooling to room temperature 3-carboxy-4-ethoxy-4'-nitro-diphenyl crystallizes from the reaction mixture. It may be purified by recrystallization from alcohol. The yield obtained by separation from the reaction mixture may be somewhat increased by recovery and purification of the material which remains in solution in the acetic acid. More highly nitrated compounds are present in the acetic acid liquor.

57.4 grams (0.2 mol.) of 3-carboxy-4-ethoxy-4'-nitro-diphenyl is converted into the sodium salt by dissolving in an aqueous solution containing 8.0 grams (0.2 mol.) of sodium hydroxide. The dry sodium salt is obtained by evaporation to dryness followed by heating at a temperature of 110° C. or higher for several hours. The dry powdered sodium salt is heated, preferably in a flask equipped with a reflux condenser, with an excess of ethylene bromide for five hours with agitation on an oil bath at 150–155° C. As an alternative method, the mixture may be heated in a sealed tube. At the end of the reaction period, the by-product sodium bromide is removed by filtration. The reaction products, soluble in ethylene bromide, are then recovered by removal of the excess of ethylene bromide by distillation, preferably under reduced pressure.

Separation of 3-beta-bromo-carbethoxy-4-ethoxy-4'-nitro-diphenyl from the byproduct of the ethylene glycol diester is then accomplished by extraction with a solvent, such as ether, in which the monoester is soluble, and the crude desired product is then recovered by evaporation of the solvent. The product is a bright yellow solid, which may be purified by crystallization from a mixture of 70 per cent of acetone with 30 per cent of water.

39.4 grams (0.1 mol.) of 3-beta-bromo-carbethoxy-4-ethoxy-4'-nitro-diphenyl is treated with an excess over 14.6 grams (0.2 mol.) of diethylamine. No apparent reaction takes place at room temperature and the mixture is heated in a water bath at 60° C. for three hours. The reaction mixture gradually changes to a jelly-like mass intermixed with large colorless crystals of diethyl amine-hydrobromide.

The reaction products are separated by removal of the excess of diethyl amine by evaporation, after which the residue is suspended in water and the aqueous suspension extracted with benzene. The resulting benzene extract, after washing with water to remove any remaining diethyl amine and diethyl amine hydrobromide, contains principally the desired beta-diethyl-amino-ethyl-ester and certain by-products which are insoluble in dilute mineral acids. The benzene solution is next extracted with dilute hydrochloric acid which removes the desired ester in the form of its water soluble hydrochloride. The ester is then precipitated from the solution of its hydrochloride by neutralization with sodium hydroxide or other suitable alkali and then recovered from the resulting suspension by extraction with benzene or ether. After drying with sodium sulfate, the solvent is removed by evaporation or distillation leaving a reddish yellow viscous oil.

Reduction of this 3-beta-diethyl-amino-carbethoxy-4-ethoxy-4'-nitro-diphenyl to the corresponding 4'-amino-derivative may be satisfactorily effected by powdered iron and water or by catalytic reduction with hydrogen using a catalyst such as platinum oxide. The latter method has the advantage of simplicity.

5 grams of 3-beta-diethyl-amino-carbethoxy-4-ethoxy-4'-nitro-diphenyl is dissolved in 60 cc. of absolute alcohol, treated with 0.25 grams of platinum oxide catalyst and the mixture agitated with hydrogen under a pressure of 30 pounds per square inch for one hour or until reduction is complete. The color of the solution is changed from a reddish yellow to a practically colorless solution.

The reduced compound, 3-beta-diethyl-amino-carbethoxy-4-ethoxy-4'-amino-diphenyl, is recovered by filtration to remove the catalyst, followed by evaporation of the solvent. Further purification may be accomplished by taking the residue up in dilute hydrochloric acid, filtering and precipitating the ester from the solution of its hydrochloride by neutralization with sodium hydroxide or other alkali. The ester is then recovered from the resulting suspension by extraction with a solvent, such as ether, drying the extract with sodium sulfate and evaporating the solvent.

The product is an almost colorless oil, which is soluble in alcohol, ether, benzene, acetone and other organic solvents and as its mono or dihydrochloride in an aqueous solution of hydrochloric acid. It is fairly stable in water and completely saponified by boiling with sodium hydroxide solution.

The mono or dihydrochlorides are formed by dissolving the free base in a suitable solvent such as ether and passing less or more dry hydrochloric acid gas through the solution depending upon whether the mono or dihydrochloride is desired. The salts of other acids may be prepared and used in anesthetics.

The dialkyl-amino-alkyl-esters of the carboxy-alkoxy-amino-diphenyls and particularly such esters of amino-substituted 2 and 4-alkoxy-3-carboxy-diphenyls may be employed in the preparation of anesthetics.

3-beta-diethyl-amino-carbethoxy-4-ethoxy-4'-amino-diphenyl, for example, has been found valuable as a local anesthetic, particularly as a solution of a hydrochloride. Solutions of the salts which have a low pH value may be buffered with a buffering agent such as a phosphate. A two per cent aqueous solution of the dihydrochloride buffered with sodium phosphate may be used as a local anesthetic.

Other compounds may readily be formed by employing other alkyl compounds in the various steps of the process. For example, to form a butyl or a propyl ether, a butyl or propyl compound should be employed instead of ethyl sulfate in the etherification. Instead of employing ethylene bromide in the esterification step, other alkyl halides may be used. Branched chain compounds may be formed by using secondary, etc. alkyl halides. Butylene and normal propylene dibromide will form straight chain derivatives. Furthermore, the bromine may be replaced by other amines such as dibutyl or dipropyl, etc. amines or methyl-ethyl amine, etc.

Derivatives may be prepared as by replacing the hydrogens of the ring-substituted amino group by ethyl or other alkyl groups.

We claim:

1. A compound from the group consisting of the amino-alkyl esters of carboxy-alkoxy-amino-diphenyls and inorganic salts thereof.
2. A compound of the group consisting of the amino derivatives of the amino-alkyl esters of 3-carboxy-4-alkoxy-diphenyls and inorganic salts thereof.
3. A compound of the group consisting of the amino derivatives of the dialkyl-amino-alkyl esters of 3-carboxy-4-alkoxy-diphenyls and inorganic salts thereof.
4. A dialkyl-amino-alkyl ester of a 3-carboxy-4-alkoxy-4'-amino-diphenyl.
5. A salt of a dialkyl-amino-alkyl ester of a 3-carboxy-4-alkoxy-4'-amino-diphenyl
6. As a new compound 3-beta-diethyl-amino-carbethoxy-4-ethoxy-4'-amino-diphenyl.
7. As a new compound, a hydrochloride of 3-beta-diethyl-amino-carbethoxy-4-ethoxy-4'-amino-diphenyl.
8. An anesthetic comprising a small percentage of a dialkyl-amino-alkyl ester of a carboxy-alkoxy-amino-diphenyl.
9. An anesthetic comprising a small percentage of a compound from the group consisting of the amino derivatives of the dialkyl-amino-alkyl esters of, the 3-carboxy-4-alkoxy-diphenyls and inorganic salts thereof.
10. An anesthetic comprising a small percentage solution of a compound from the group consisting of the dialkyl-amino-alkyl esters of the 3-carboxy-4-alkoxy-4'-amino-diphenyls and inorganic salts thereof.
11. An anesthetic comprising a small percentage of 3-beta-diethyl-amino-carbethoxy-4-ethoxy-4'-amino-diphenyl.
12. An anesthetic comprising a hydrochloride of 3-beta-diethyl-amino-carbethoxy-4-ethoxy-4'-amino-diphenyl and an alkaline buffering agent.

WALTER G. CHRISTIANSEN.
ADELBERT W. HARVEY.